United States Patent
White

(10) Patent No.: US 9,937,763 B2
(45) Date of Patent: Apr. 10, 2018

(54) SUSPENSION ASSEMBLY FOR UTILITY VEHICLE

(71) Applicant: KUBOTA CORPORATION, Osaka (JP)

(72) Inventor: John White, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/189,407

(22) Filed: Jun. 22, 2016

(65) Prior Publication Data

US 2017/0368898 A1    Dec. 28, 2017

(51) Int. Cl.
*B60G 3/20* (2006.01)
*B60G 7/00* (2006.01)

(52) U.S. Cl.
CPC .............. *B60G 3/20* (2013.01); *B60G 7/001* (2013.01); *B60G 2200/144* (2013.01); *B60G 2204/43* (2013.01); *B60G 2206/50* (2013.01)

(58) Field of Classification Search
CPC ...... B60G 3/20; B60G 7/001; B60G 2206/50; B60G 2204/43; B60G 2200/144
See application file for complete search history.

(56) References Cited

U.S. PATENT DOCUMENTS

| | | | | |
|---|---|---|---|---|
| 6,398,240 B1* | 6/2002 | Taylor | ............... | B60G 3/18 280/93.511 |
| 6,860,498 B2* | 3/2005 | McGaughy | ............ | B60G 7/008 280/93.51 |
| 7,703,779 B2* | 4/2010 | Sumey | ............... | B60T 5/00 280/93.512 |
| 8,573,615 B2 | 11/2013 | Kuwabara et al. | | |
| 2004/0108674 A1* | 6/2004 | McGaughy | ............ | B60G 7/008 280/93.512 |
| 2007/0063472 A1* | 3/2007 | Hsieh | ............... | B62D 7/18 280/93.512 |
| 2007/0158143 A1* | 7/2007 | Valvano | ............... | F16D 55/227 188/71.5 |
| 2016/0090122 A1* | 3/2016 | Conner | ............... | B60G 7/001 280/93.512 |
| 2016/0121927 A1* | 5/2016 | Schaake | ............... | B60B 5/02 280/93.512 |

\* cited by examiner

*Primary Examiner* — Darlene P Condra

(74) *Attorney, Agent, or Firm* — Greenblum & Bernstein, P.L.C.

(57) ABSTRACT

A suspension assembly for a utility vehicle includes a knuckle having a boss, a first suspension arm extending radially outward from the boss, a second suspension arm extending radially outward from the boss in a direction opposite to the first suspension arm, a first brake arm extending radially outward from the boss near the first suspension arm, and a second brake arm extending radially outward from the boss near the second suspension arm. The knuckle can be switchably used for both of a right driving wheel and a left driving wheel. The suspension assembly further includes an upper arm connected to the first suspension arm, a lower arm connected to the second suspension arm, and a brake caliper connected to the first brake arm and the second brake arm.

9 Claims, 7 Drawing Sheets ically driving rear wheels 12 is described, the same structure can also be applied for a suspension assembly for the steerable and driving front wheels 11.

SUSPENSION ASSEMBLY FOR UTILITY VEHICLE

TECHNICAL FILED OF INVENTION

The present invention relates to a suspension assembly for a utility vehicle for operatively coupling a vehicle frame to a pair of right and left driving wheels.

RELATED ART OF INVENTION

A utility vehicle includes a vehicle frame and a pair of right and left rear wheels. The rear wheels support the vehicle frame via a suspension assembly. U.S. Pat. No. 8,573,615 discloses an example of such a suspension assembly for steerable driving front wheels. The suspension assembly includes a strut damper with an upper end coupled to a vehicle frame and extending downward, a knuckle support element extending downward from a lower part of the strut damper, a lower arm extending in a vehicle width direction for coupling a lower part of the knuckle support element to the vehicle frame, a knuckle attached to the knuckle support element to be rotatable about a king pin axis to support the wheel, and a tie rod extending in the vehicle width direction to rotate the knuckle about the king pin axis.

According to U.S. Pat. No. 8,573,615, the knuckle includes an upper arm and an extended part extending upward from a boss having a central hole, a lower arm extending downward from the boss, and caliper supporting parts laterally extending from the boss to support a brake caliper. The knuckle is attached to the knuckle support element to be relatively rotatable, and the lower arm is connected to the knuckle support element. Such a complicated structure of the knuckle results in increase in the manufacturing cost. Moreover, such a knuckle cannot be switchably used for both of the right wheel and the left wheel, which requires that a knuckle for the right wheel and a knuckle for the left wheel be separately manufactured and the inventory control be separately performed.

SUMMARY OF INVENTION

The present invention has been made having regard to the above disadvantages, and its object is to simplify the construction of the knuckle. To achieve such an object, the present invention provides a suspension assembly for operatively coupling a vehicle frame to a pair of right and left driving wheels in a utility vehicle, the suspension assembly being provided with a knuckle including a boss having a central hole for receiving an axle, a first suspension arm extending radially outward from the boss, a second suspension arm extending radially outward from the boss in a direction opposite to the first suspension arm, a first brake arm extending radially outward from the boss near the first suspension arm, and a second brake arm extending radially outward from the boss near the second suspension arm. The suspension assembly further includes an upper arm connected to the first suspension arm, a lower arm connected to the second suspension arm, and a brake caliper connected to the first brake arm and the second brake arm. The knuckle is switchably used for both of the right driving wheel and the left driving wheel.

The knuckle according to the present invention can be attached to either of the right driving wheel and the left driving wheel. Thus, the first suspension arm and the second suspension arm have substantially the same shape, and the first brake arm and the second brake arm have substantially the same shape. According to one preferred embodiment of the present invention, the first suspension arm and the second suspension arm have symmetry with respect to a central horizontal plane passing through a center axis of the central hole, and the first brake arm and the second brake arm also have symmetry with respect to the same central horizontal plane. With such an arrangement, the knuckle to be attached to the right wheel is rotated by 180 degrees about the center axis when attached to the left wheel. As such, the knuckle can be switchably used for both of the right rear wheel and the left rear wheel, which can reduce the manufacturing cost and the inventory control cost for the knuckle.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
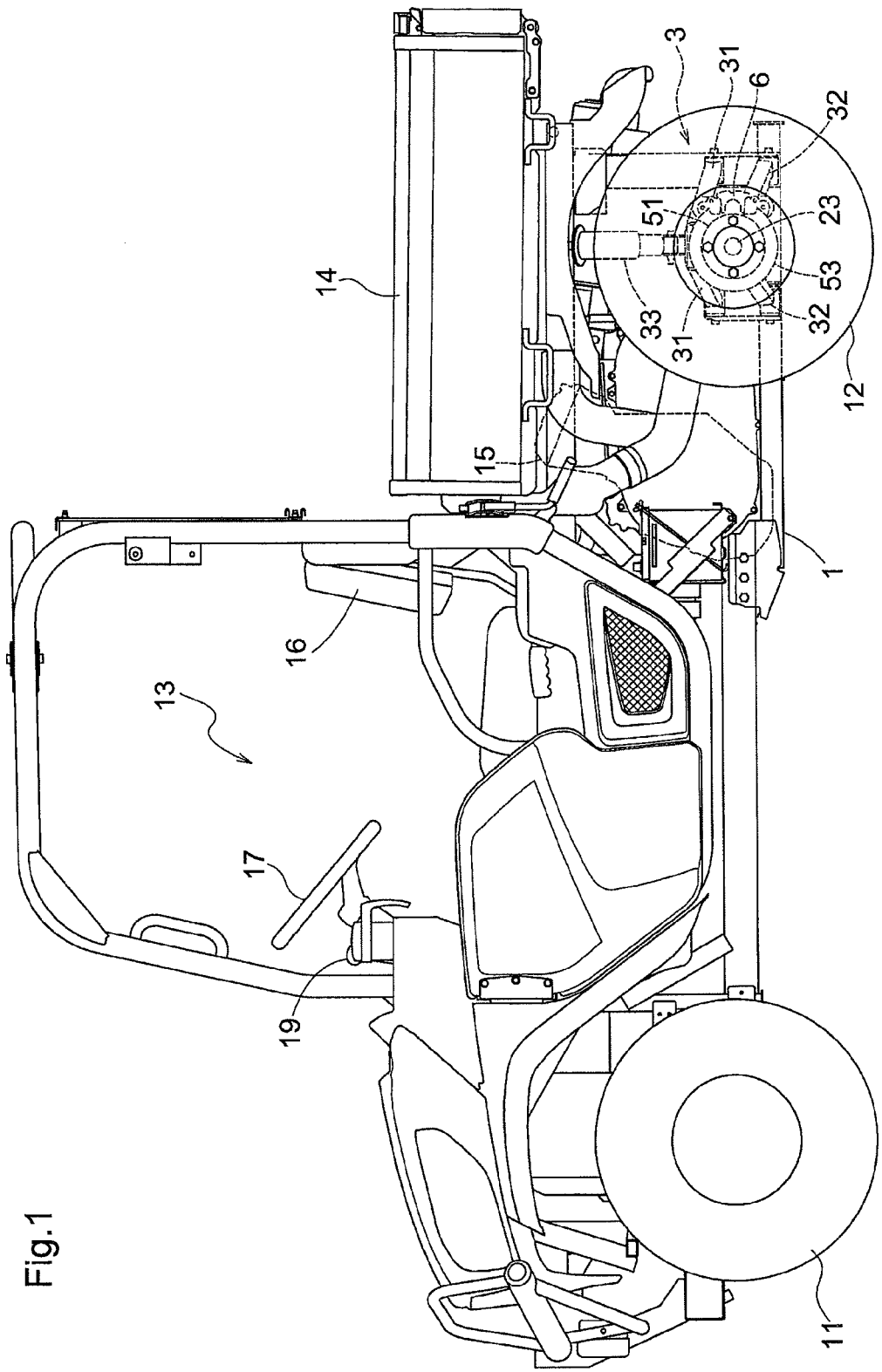
FIG. 1 is a side view of a utility vehicle according to the present invention.

FIG. 1 shows a utility vehicle (UV) which can be used in different ways, such as for load transportation and recreation. The UV includes a pair of right and left steerable and driving front wheels 11, a pair of right and left non-steerable driving rear wheels 12, and a suspension assembly 3, and a vehicle frame 1 supported by the front wheels 11 and the rear wheels 12 via the suspension assembly 3. The vehicle further includes a driver's section 13 mounted on a longitudinal central part of the vehicle frame 1, a platform 14 mounted rearward of the driver's section 13 for loading, and an engine compartment provided downward of the platform 14 for accommodating an engine 15. The driver's section 13 includes a driver's seat 16 and control tools such as a steering wheel 17 and a shift lever 19. The steering 17 and the shift lever 19 are mounted on a front panel provided in front of the driver's seat 16.

Figure 2:
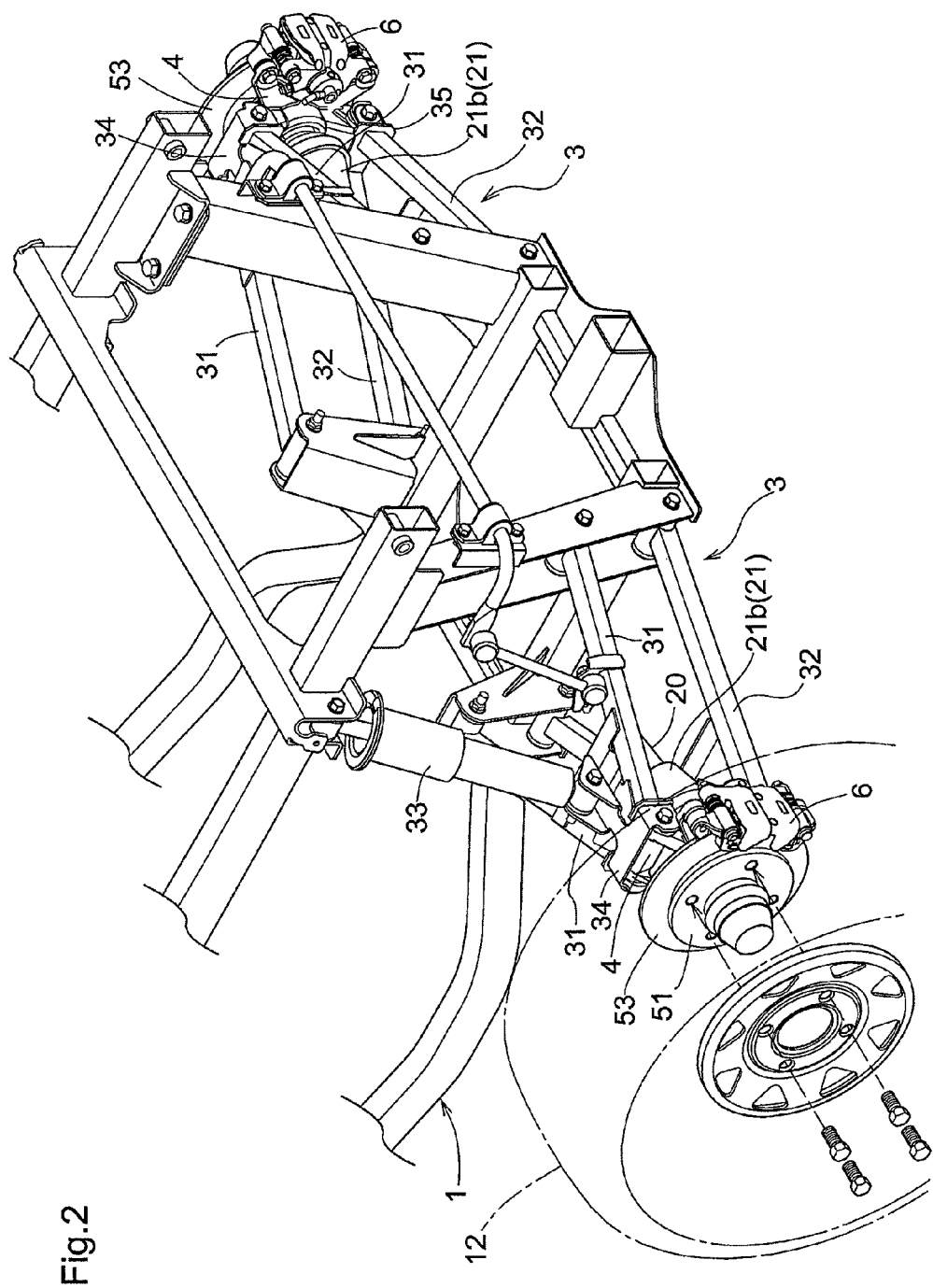
FIG. 2 is a perspective view of a rear-wheel suspension assembly supported by a vehicle frame of the utility vehicle.
Figure 3:
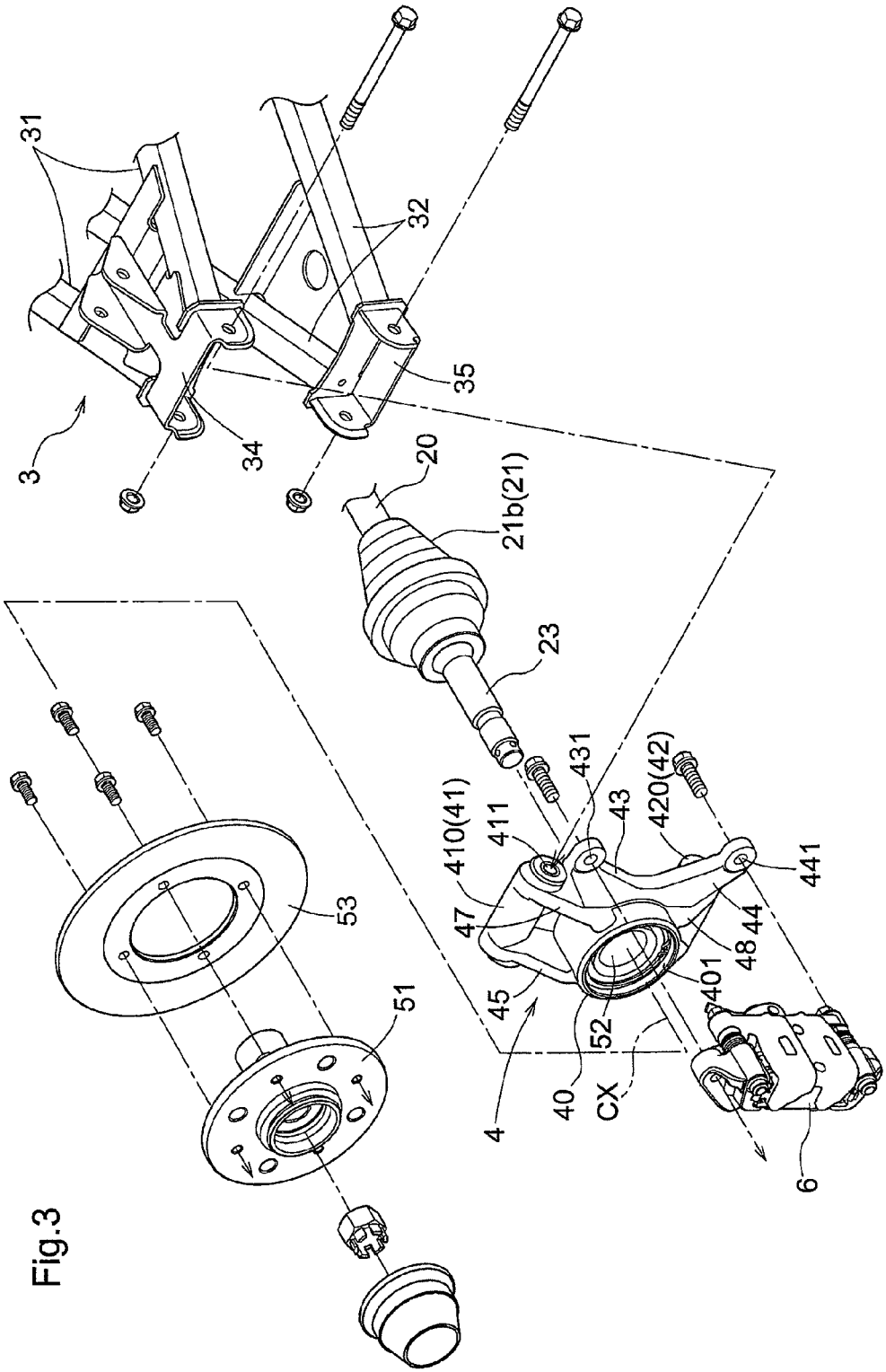
FIG. 3 is an exploded perspective view of a knuckle and its proximate components in the suspension assembly.
Figure 4:
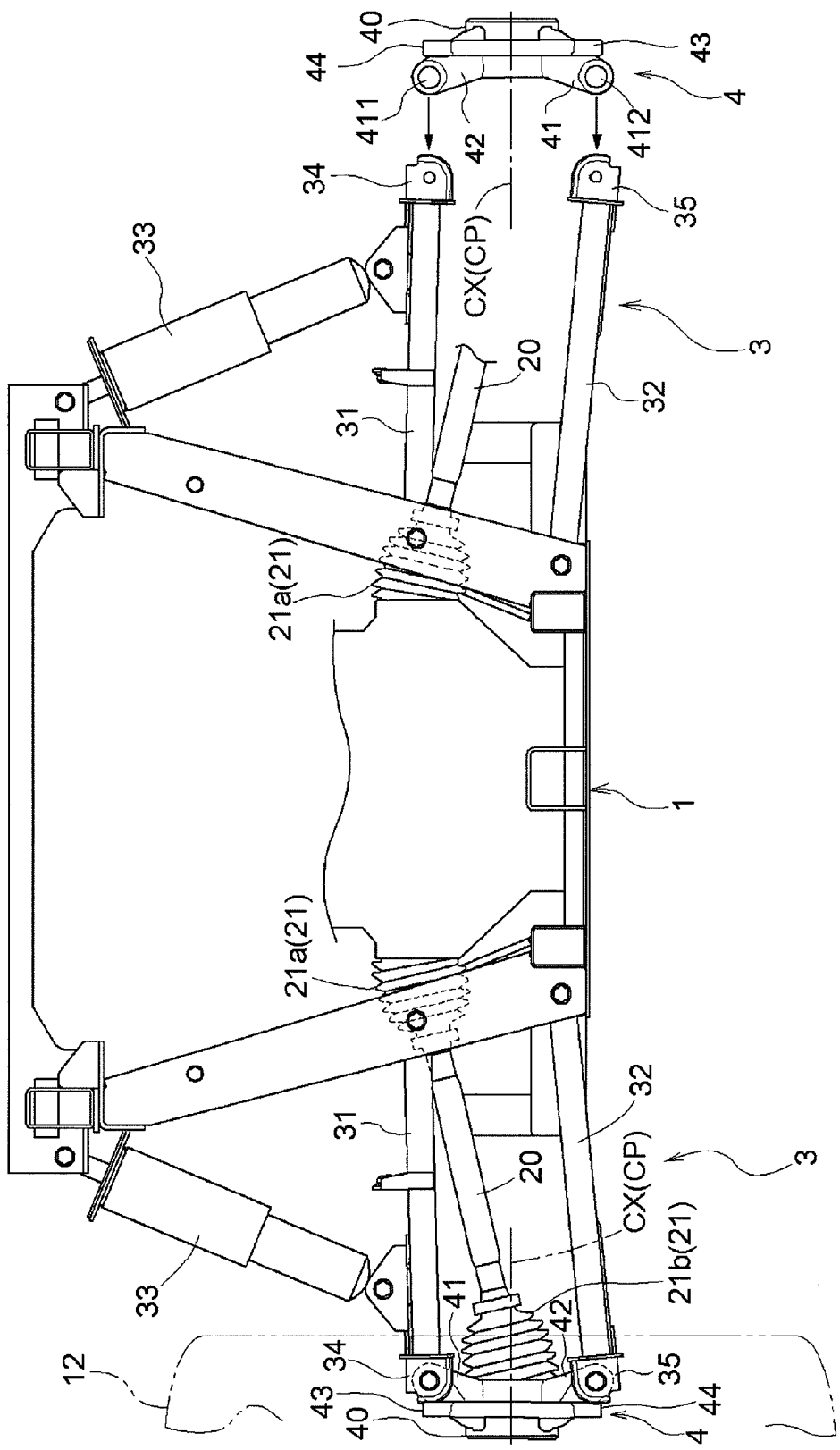
FIG. 4 is a rear view of the suspension assembly.

Referring to FIG. 2, the vehicle frame 1 is supported by the pair of right and left rear wheels 12 via the suspension assembly 3. Power is transmitted to each of the driving rear wheels 12 from a rear-wheel drive shaft 20 through a joint unit 21 having a boot 21a at a vehicle side and a boot 21b at a wheel side. As seen from FIGS. 3 and 4, the suspension assembly 3 includes an upper arm 31, a lower arm 32, a knuckle 4, and a damper 33. The upper arm 31 and the lower arm 32 have substantially the same shape, that is, an A shape as viewed from the top. An upper mounting element 34 having mounting holes is attached to a distal end portion of the upper arm 31, and a lower mounting element 35 having mounting holes is attached to a distal end portion of the lower arm 32.

Referring to FIGS. 5 to 10, the knuckle 4 is an integrated unit formed of a boss 40, a first suspension arm 41, a second suspension arm 42, a first brake arm 43, and a second brake arm 44. The boss 40 is a cylindrical element having a central hole 401 for receiving an axle. As seen from FIGS. 9 and 10, a central plane CP extends horizontally passing through an axis (center axis) CX of the central hole 401.

The first suspension arm 41 extends radially outward from an upper circumferential surface of the boss 40, and the second suspension arm 42 extends radially outward from a lower circumferential surface of the boss 40. The first suspension arm 41 and the second suspension arm 42 are arranged right opposite to each other across the center axis CX to form an angle of 180 degrees with each other. In other words, the first suspension arm 41 and the second suspension arm 42 have symmetry with respect to the central plane CP. The first suspension arm 41 has a sleeve 410 formed at a free end thereof. The sleeve 410 has a first bolt bore 411 with its axis extending perpendicularly to the center axis CX and parallel to the central plane CP. Likewise, the second suspension arm 42 has a sleeve 420 formed at a free end thereof. The sleeve 420 has a second bolt bore 421 with its axis extending perpendicularly to the center axis CX and parallel to the central plane CP. As seen from FIG. 3, the mounting holes of the upper mounting element 34 of the upper arm 31 and the first bolt bore 411 of the sleeve 410 are aligned with each other, through which a bolt extends to fasten and connect the first suspension arm 41 to the upper arm 31. Likewise, the mounting holes of the lower mounting element 35 of the lower arm 32 and the second bolt bore 421 of the sleeve 420 are aligned with each other, through which a bolt extends to fasten and connect the second suspension arm 42 to the lower arm 32.

Further, the first brake arm 43 and the second brake arm 44 extend radially outward from an area of the circumferential surface of the boss 40 between the first suspension arm 41 and the second suspension arm 42. The first brake arm 43 and the second brake arm 44 are arranged to form an angle of 90 degrees with each other with respect to the center axis CX and connected to each other at their proximal areas. The first brake arm 43 has a third bolt bore 431 at a free end thereof extending parallel to the center axis CX, and the second brake arm 44 has a forth bolt bore 441 at a free end thereof extending parallel to the center axis CX. As seen from FIG. 3, the third bolt bore 431 and the fourth bolt bore 441 function as a mounting part for a brake caliper 6. The first brake arm 43 and the second brake arm 44 have symmetry with respect to the central plane CP.

The first bolt bore 411 and the third bolt bore 431 are arranged opposite to the second bolt bore 421 and the fourth bolt bore 441 across the central plane CP. All of these bores are positioned at the same distance from the central plane CP. The first bolt bore 411 is offset from the third bolt bore 431 along the center axis CX and the second bolt bore 421 is offset from the fourth bolt bore 441 along the center axis CX.

Figure 6:
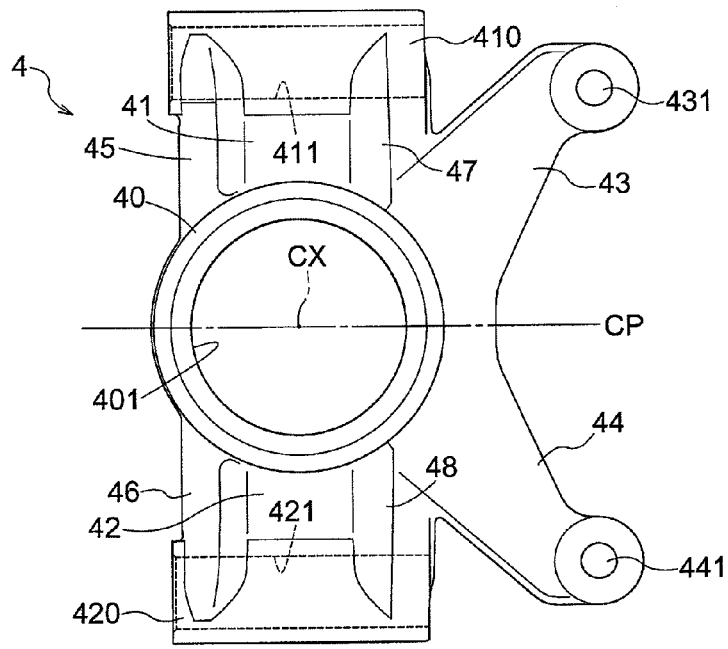
FIG. 6 is a side view of the knuckle.
Figure 7:
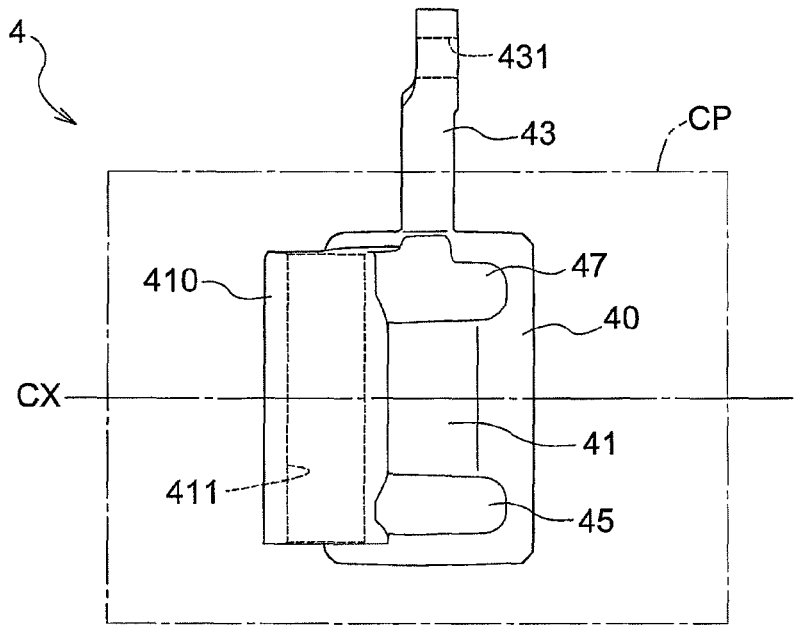
FIG. 7 is a top plan view of the knuckle.
Figure 8:
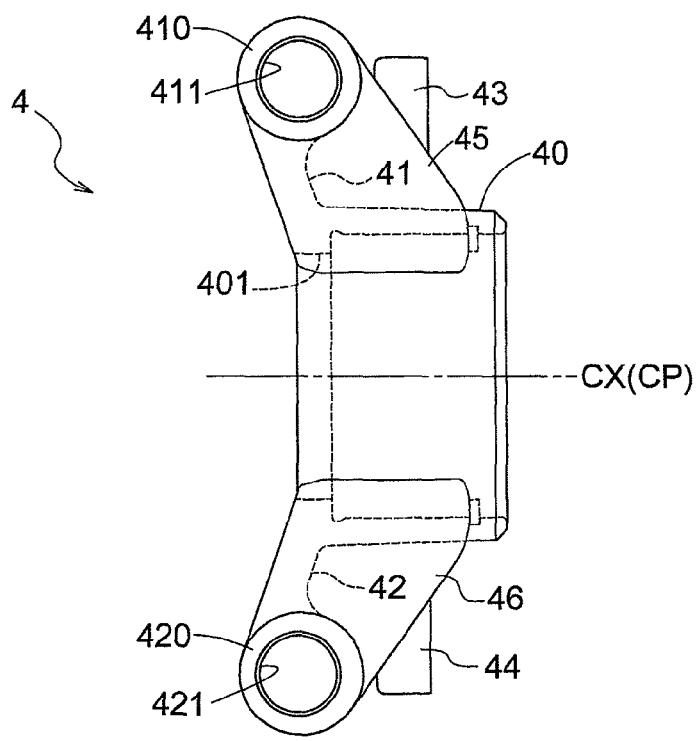
FIG. 8 is a front view of the knuckle.
Figure 9:
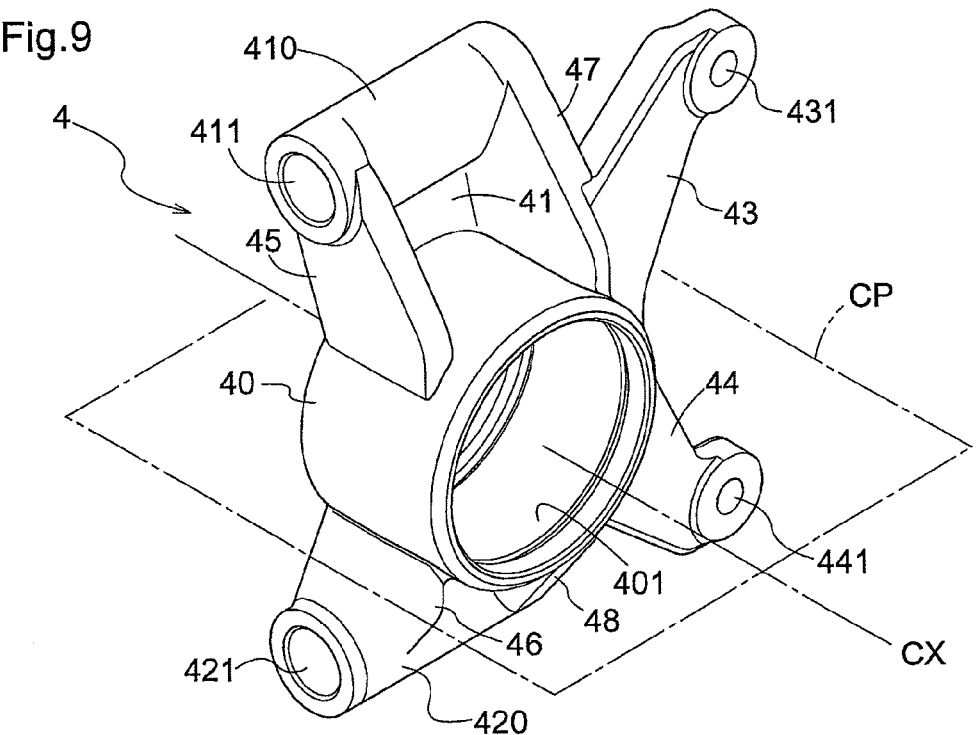
FIG. 9 is a perspective view of a front side of the knuckle.
Figure 10:
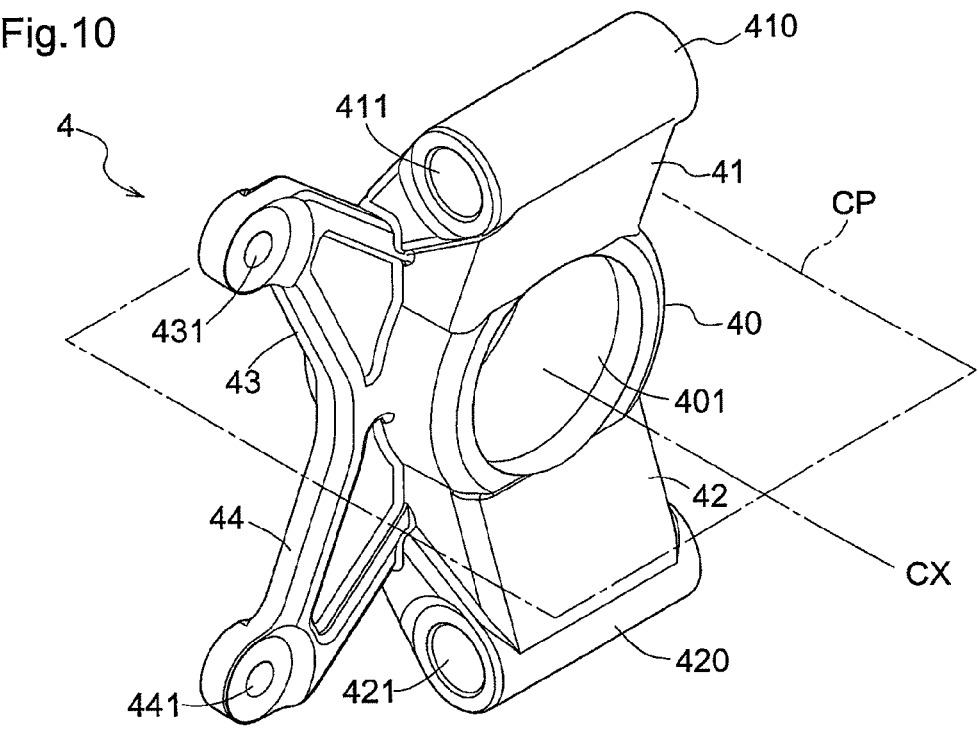
FIG. 10 is a perspective view of a back side of the knuckle.

Referring to FIG. 6, the first suspension arm 41 has a first rib 45 at one side part thereof, and the second suspension arm 42 has a second rib 46 at one side part thereof. The first rib 45 extends from the sleeve 410 to the circumferential surface of the boss 40, and the second rib 46 extends from the sleeve 420 to the circumferential surface of the boss 40. Further, the first suspension arm 41 has a third rib 47 at the other side part thereof, and the second suspension arm 42 has a fourth rib 48 at the other side part thereof. The third rib 47 extends from the sleeve 410 to the circumferential surface of the boss 40, and the fourth rib 48 extends from the sleeve 420 to the circumferential surface of the boss 40. The first suspension arm 41 and the second suspension arm 42 each have a substantially plate-like shape apart from the sleeves 410 and 420. The provision of the first to fourth ribs 45 to 48 allows each of the first and second suspension arms to have a channel-shaped vertical section to increase the strength of the arms. Further, the third rib 47 is joined to the proximal area of the first brake arm 43 to increase the strength of the first brake arm 43. Likewise, the fourth rib 48 is joined to the proximal area of the second brake arm 44 to increase the strength of the second brake arm 44.

With the above arrangement, the knuckle 4 can be attached to either of the right rear wheel 12 and the left rear wheel 12. More particularly, the knuckle 4 to be attached to the right rear wheel 12 is reversed, i.e., rotated by 180 degrees about an axis that is perpendicular to the center axis CX (with the perpendicular axis and axis CX together defining the plane CP (see FIGS. 4-6, e.g.)), when attached to the left rear wheel 12. As such, the knuckle 4 can be switchably used for both of the right rear wheel and the left rear wheel, which can reduce the manufacturing cost and the inventory control cost for the knuckle 4.

Figure 5:
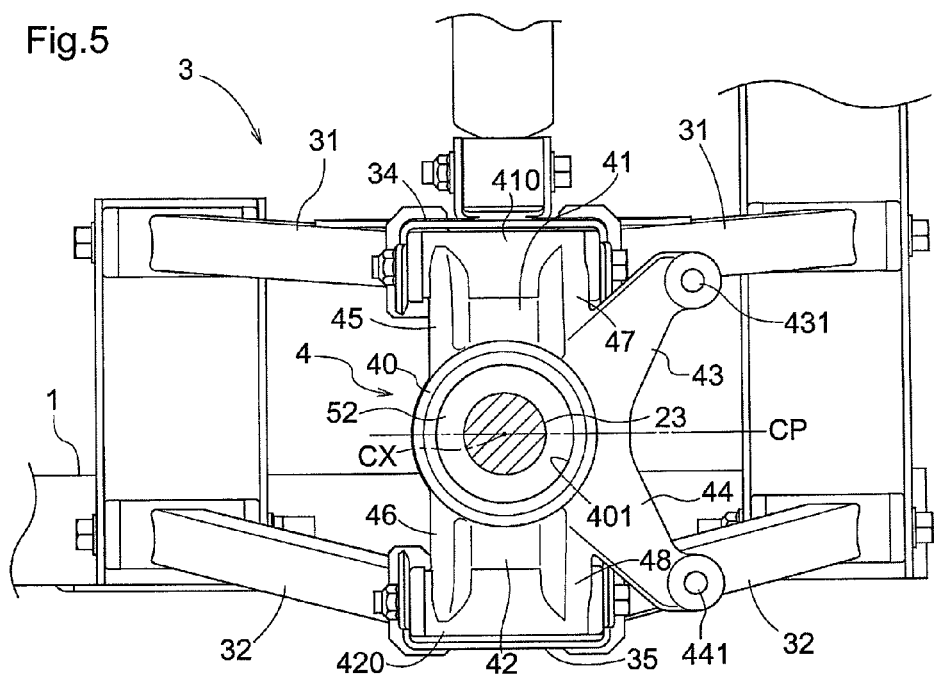
FIG. 5 is a side view of the knuckle connected to an upper arm and a lower arm of the suspension assembly.

Referring now to FIG. 5, a rear wheel hub 51 is fitted into the central hole 401 of the boss 40 of the knuckle 4 via a bearing 52. Further, a rear axle 23 is inserted and splined to the rear wheel hub 51 to receive power from the rear-wheel drive shaft 20.

It is noted that the foregoing example has been provided merely for the purpose of explanation and is in no way to be construed as limiting of the present invention.

What is claimed is:
1. A suspension assembly for operatively coupling a vehicle frame to a pair of right and left driving wheels in a utility vehicle, the suspension assembly comprising:
  a knuckle including
    a boss having a central hole for receiving an axle,
    a first suspension arm extending radially outward from the boss,
    a second suspension arm extending radially outward from the boss in a direction opposite to the first suspension arm,
    a first brake arm extending radially outward from the boss near the first suspension arm, and
    a second brake arm extending radially outward from the boss near the second suspension arm;
  an upper arm connected to the first suspension arm;
  a lower arm connected to the second suspension arm; and
  a brake caliper connected to the first brake arm and the second brake arm, wherein the knuckle is switchably used for both of the right driving wheel and the left driving wheel, wherein the first suspension arm and the second suspension arm have symmetry with respect to a central horizontal plane passing through a center axis of the central hole, and wherein the first brake arm and the second brake arm have symmetry with respect to the central plane.

2. The suspension assembly according to claim 1, wherein the first suspension arm includes a first mounting part at a free end portion thereof for receiving the upper arm, the second suspension arm includes a second mounting part at a free end portion thereof for receiving the lower arm, the first brake arm includes a third mounting part at a free end portion thereof for receiving the brake caliper, and the second brake arm includes a fourth mounting part at a free end portion thereof for receiving the brake caliper, and wherein the first mounting part and the second mounting part are arranged to have symmetry with respect to the central plane, and the third mounting part and the fourth mounting part are arranged to have symmetry with respect to the central plane.

3. The suspension assembly according to claim 2, wherein the first mounting part is offset from the third mounting part along the center axis of the central hole, and the second mounting part is offset from the fourth mounting part along the center axis of the central hole.

4. The suspension assembly according to claim 2, wherein the first mounting part, the second mounting part, the third mounting part, and the fourth mounting part are formed as bolt bores, and wherein each of the bolt bores of the first and second mounting parts has an axis extending perpendicular to an axis of each of the bolt bores of the third and fourth mounting parts.

5. The suspension assembly according to claim 1, wherein the first suspension arm has a first rib at one side part thereof, the first rib extending from a free end portion of the first suspension arm to the boss, and the second suspension arm has a second rib at one side part thereof, the second rib extending from the free end portion of the second suspension arm to the boss, wherein the first suspension arm has a third rib at an other side part thereof, the third rib extending from the free end portion of the first suspension arm to the boss, and the second suspension arm has a fourth rib at the other side part thereof, the fourth rib extending from the free end portion of the second suspension arm to the boss, and wherein the third rib is joined to the first brake arm to reinforce the first brake arm, and the fourth rib is joined to the second brake arm to reinforce the second brake arm.

6. The suspension assembly according to claim 1, wherein the boss, the first suspension arm, the second suspension arm, the first brake arm, and the second brake arm are formed integrally with each other.

7. The suspension assembly according to claim 1, wherein the knuckle receives the axle of the non-steerable rear wheel.

8. A suspension assembly for operatively coupling a vehicle frame to a pair of right and left driving wheels in a utility vehicle, the suspension assembly comprising:

a knuckle including a boss having a central hole for receiving an axle,
a first suspension arm extending radially outward from the boss,
a second suspension arm extending radially outward from the boss in a direction opposite to the first suspension arm,
a first brake arm extending radially outward from the boss near the first suspension arm, and
a second brake arm extending radially outward from the boss near the second suspension arm;

an upper arm connected to the first suspension arm;
a lower arm connected to the second suspension arm; and
a brake caliper connected to the first brake arm and the second brake arm, wherein a center axis CX extends through the central hole of the boss, and a central horizontal plane CP passes through the center axis, wherein the knuckle is configured to be switchably used for both of the right driving wheel and the left driving wheel, so that in switching the knuckle from use for the right driving wheel to use for the left driving wheel, the knuckle is rotated by 180 degrees about an axis that is perpendicular to the to the center axis CX, with the perpendicular axis and the center axis CX together define the central horizontal plane CP.

9. A suspension assembly for operatively coupling a vehicle frame to a pair of right and left driving wheels in a utility vehicle, the suspension assembly comprising:

a knuckle including a boss having a central hole for receiving an axle,
a first suspension arm extending radially outward from the boss,
a second suspension arm extending radially outward from the boss in a direction opposite to the first suspension arm,
a first brake arm extending radially outward from the boss near the first suspension arm, and
a second brake arm extending radially outward from the boss near the second suspension arm;

an upper arm connected to the first suspension arm;
a lower arm connected to the second suspension arm; and
a brake caliper connected to the first brake arm and the second brake arm, wherein the knuckle is switchably used for both of the right driving wheel and the left driving wheel;

wherein the first suspension arm has a first rib at one side part thereof, the first rib extending from a free end portion of the first suspension arm to the boss, and the second suspension arm has a second rib at one side part thereof, the second rib extending from the free end portion of the second suspension arm to the boss, wherein the first suspension arm has a third rib at an other side part thereof, the third rib extending from the free end portion of the first suspension arm to the boss, and the second suspension arm has a fourth rib at the other side part thereof, the fourth rib extending from the free end portion of the second suspension arm to the boss, and wherein the third rib is joined to the first brake arm to reinforce the first brake arm, and the fourth rib is joined to the second brake arm to reinforce the second brake arm.

* * * * *

UNITED STATES PATENT AND TRADEMARK OFFICE
CERTIFICATE OF CORRECTION

PATENT NO. : 9,937,763 B2
APPLICATION NO. : 15/189407
DATED : April 10, 2018
INVENTOR(S) : J. White Page 1 of 1

It is certified that error appears in the above-identified patent and that said Letters Patent is hereby corrected as shown below:

At Column 6, Line 24 (Claim 8, Line 27), please change "to the to the" to -- to the --.

Signed and Sealed this
Thirteenth Day of November, 2018

Andrei Iancu
*Director of the United States Patent and Trademark Office*